Patented Oct. 9, 1945

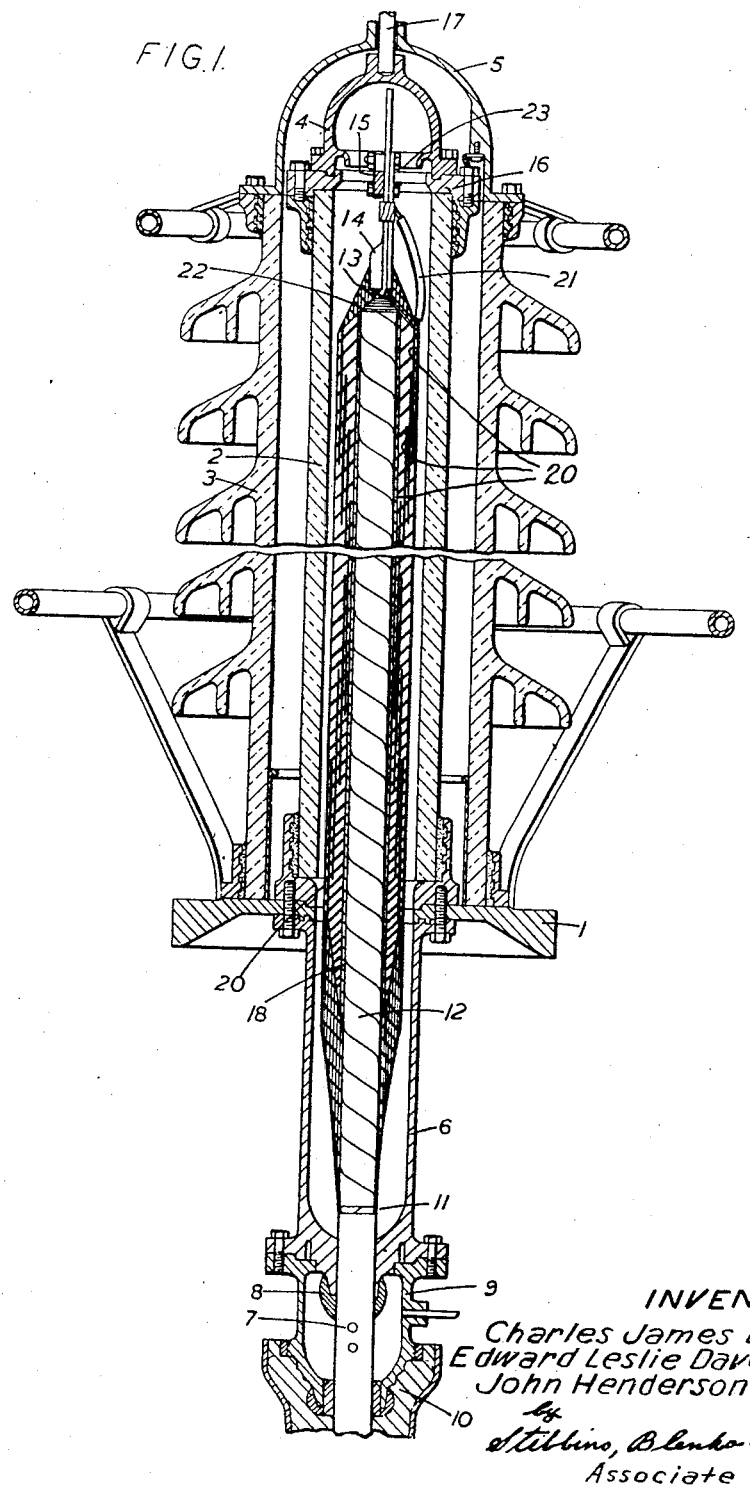

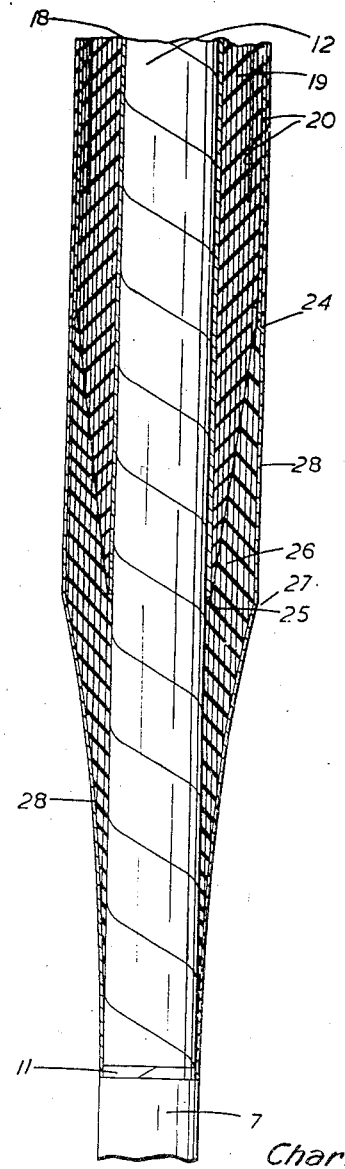

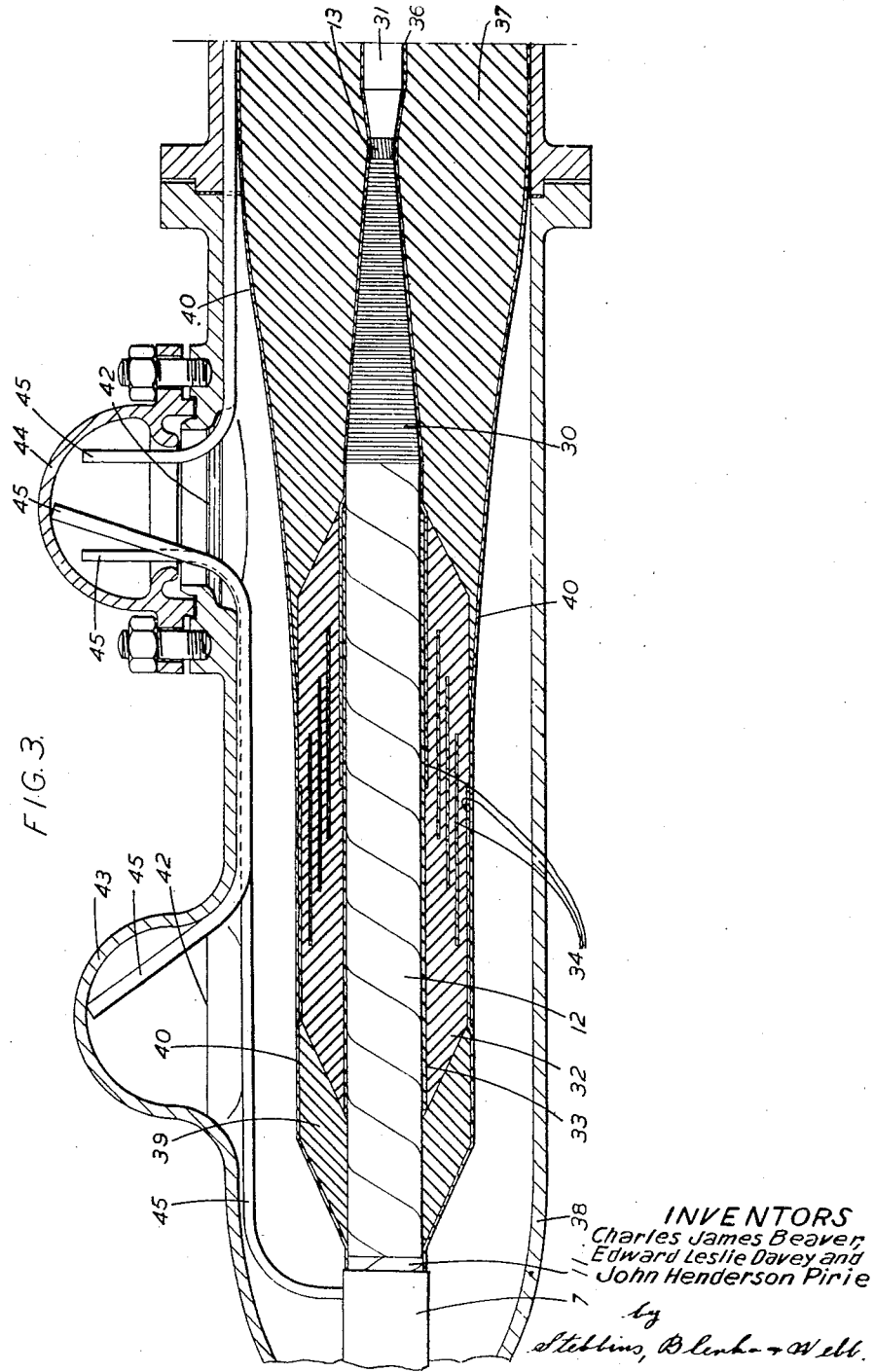

2,386,185

UNITED STATES PATENT OFFICE 2,386,185

HIGH VOLTAGE ELECTRIC CABLE TERMINATION AND JOINT

Charles James Beaver, Bowdon, Edward Leslie Davey, Timperley, and John Henderson Pirie, Hale, England, assignors to W. T. Glover & Company Limited, Trafford Park, England, a British company Application June 26, 1944, Serial No. 542,170
In Great Britain July 12, 1943

4 Claims. (Cl. 174—73)

This invention relates to the terminating and jointing of electric cables, intended to work at very high voltages. It deals with that type of termination or joint in which a sleeve slipped over the bared end of the cable dielectric is used to reinforce this dielectric and to control the stress distribution in it and on it and generally in the region surrounding this bared end, that is to say the part from which the sheath and conductive screen, usually provided, have been stripped. As is well known such sleeves, which are frequently described as of the condenser type, are made by machine-wrapping on a tube of Bakelized paper, or other appropriate dielectric material, a sheet of dielectric material, which may be impregnated paper, which is coiled up to the appropriate thickness and has, during the coiling, conductive layers inserted at intervals in it. Each of these layers may consist of a strip of metal foil and is of such a length as to make a complete turn round the axis within the wrapping of sheet dielectric material. The layers are much shorter axially than the tube and are spaced apart, both radially and longitudinally, and serve with each other and with the cable conductor to establish a number of capacities by which the distributions of the electric field and of the resulting stress are made to have the desired form. A particular object of such an arrangement is to obtain an appropriate (usually uniform) distribution of potential longitudinally at the surface of the stripped cable dielectric.

Such an arrangement of conductive layers within the sleeve may have the conducting surfaces, when seen in a longitudinal axial section of the tube, disposed in an overlapping series extending through the length of the sleeve. This series may progress continuously from the outside towards the inner part of the dielectric or from the inner part towards the outside throughout the length of the sleeve, or may progress inwardly in one part of the length and outwardly in another part of the length. The latter arrangement has the advantage of providing stress control over a considerable length without using a tube of extravagant external diameter. For higher voltages the arrangement may be extended to more than the two modes of arrangement, for instance, the conductive layers may at one end start near the inner surface, go outwards to the neighbourhood of the outer surface of the sleeve and then come inwards towards the inner surface and then progress outwards again towards the outer surface.

The desired result of obtaining a fairly uniform distribution of longitudinal stress on the surface of the stripped cable dielectric can be obtained by means of the sleeve over a considerable length, but difficulties are encountered in the region where the sleeve approaches the sheath or screen, or other earthed or earthy part by which this stripped part of the cable dielectric is terminated. In accordance with the invention we provide a sleeve and stress buffer cone so arranged and combined that the difficulties in this region are effectively dealt with.

In this arrangement a sleeve of the kind indicated is used in which the earthy end has its terminating conductive layer at or near the outer cylindrical surface of the sleeve and has the dielectric material continued longitudinally beyond that layer, tapering off in thickness towards the tube on which the sleeve is built up. Accordingly, the tube with the tapering covering of dielectric material projects axially beyond the main body of the sleeve with its conductive layers therein.

The dielectric material which projects in this way tapers off to a fine angle, when seen in cross-section, at the tube. This tapering part when in position on the cable end lies with the end of this tube at a distance from the end of the earthed or earthy covering of the cable dielectric (sheath or screen) and, over this tapering end and the length of stripped cable dielectric remaining uncovered, is built up a dielectric layer to an appropriate thickness from tightly applied flexible tape, for instance varnished silk tape. This layer is formed, at the end adjacent to the cable screen or sheath, with a taper so as to provide a buffer cone with a surface on which lies a conducting layer extending from the earthed or earthy part of the cable to the nearest conductive layer of the sleeve. The buffer cone thus formed preferably extends outward to the diameter of the outside of the sleeve and consists of a conical portion and a cylindrical portion so disposed that the tapering end portion of the sleeve lies wholly within the cylindrical portion. As above indicated the whole of the surface of this cone and its cylindrical extension is covered with a flexible conductive layer, for instance a wrapping of flexible conductive tape.

Constructed in this way the buffer cone and the condenser type sleeve combine to give a stress distribution which avoids the production of places where may be caused deterioration due to ionisation, or other result of local high stress values beyond the strength of the dielectric in such places. A layer of air or other gas between the stripped cable dielectric and the inside of the sleeve is unavoidable, but the stresses there, both radial and longitudinal, are controlled by the arrangement of the conductive layers in the sleeve as far as they extend along the sleeve. In this gas space within the sleeve, where it projects axially beyond the last conductive layer, the longitudinal stress is kept very low, owing to the fact that the dielectric built up of flexible tape over it has a constant or approximately constant outside diameter with an earthy conductive layer on the outside thereon. The radial stress in this gas space is also low because of the large external diameter of the built-up dielectric here. Any space containing a layer of gas on the outside of the cable dielectric is practically eliminated, or made of very small radial dimensions where it exists, in the part covered by the tightly applied and appropriately flexible dielectric material between the tapered end of the sleeve and the place where the stripping of the cable dielectric terminates. Accordingly this part is not subject to deterioration under radial stress. The longitudinal stress on this surface is controlled appropriately by the conical buffer with its conductive covering.

The invention is illustrated in two examples to be described by reference to the accompanying drawings. In these Figure 1 shows in longitudinal section a sealing end for a high voltage cable (of a kind appropriate for 132 kv.)

Figure 2 shows on enlarged scale a part of Figure 1; and

Figure 3 shows a longitudinal section one-half of a joint between two lengths of a cable similar to that to which Figure 1 applies.

In these examples the invention is applied to a gas filled cable of the kind described in the specification of Letters Patent No. 2,067,169.

In this type of cable the dielectric is composed of pre-impregnated paper and there is no free compound in the spaces between the turns and layers of paper. These spaces are filled with gas under pressure, which thus forms part of a composite dielectric.

A sealing end for such a cable comprises two co-axial chambers enclosed by the metal base 1, the inner and outer tubular insulators of porcelain 2 and 3 and the inner and outer terminal caps 4 and 5. The inner chamber is subjected to the pressure of the gas in the cable. It is closed at the lower end by the downward extending gland 6 attached to the base 1. This is sealed to the inner sheath 7 of the cable as shown at 8 within the gas feed gland 9. The latter is sealed off at the lower end by the cast plumb 10 which also seals off (not shown) the space between the inner and the outer sheaths of the cable. By way of the gas feed gland 9 high pressure gas can be fed into the cable. Above the end of the inner sheath 7 a short length of the screen on the cable dielectric is exposed at 11 and above this point the impregnated paper dielectric 12 of the cable is bared. This dielectric is removed from a short length of conductor 13 at the upper end. The conductor end is inserted in a socket 14 which is connected to a bridge 15 forming part of the ring 16 which is attached to the top of the inner insulator 2 and has mounted on it the inner cap 4. Connection is thus made from the cable conductor 13 to the cap 4 and the terminal stud 17 carried by it and passing through the outer cap 5.

The condenser type sleeve is built up on a bakelized paper tube 18 and is composed of a wrapping of impregnated paper 19 between the turns of which are placed conducting layers (metal foil) 20. These layers, as shown in Figure 1, commence at the top near the outer surface of the sleeve and are spaced from each other both radially and longitudinally forming a series which, as it proceeds down the sleeve from the top to the bottom, passes first inwardly towards the bakelized paper tube 18 and then outwardly again so that both the first and last layers are near the outer surface of the sleeve. The first layer is connected by means of the conductor 21 to the socket 14 and accordingly, has the potential of the cable conductor. The last layer is connected, in a manner to be described, to the screen 11 and sheath 7 and, accordingly, has the potential of these parts; that is usually earth potential. This form of sleeve provides a substantially uniform distribution of longitudinal stress from the upper to the lower end of the part of the bared cable dielectric 12 which is enclosed within the space over which the conductive layers 20 extend.

The tube 18 is a fairly close fit on the cable dielectric 12 and is placed as shown so that its upper end is level with the edge of the cable dielectric where it is cut away to uncover the conductor 13. Over the end of the cable dielectric and the upper end of the sleeve is placed a wrapping 22 of varnished silk tape which seals off these parts and the conductors from the surrounding compound with which the inner chamber is filled up to the level 23. A similar filling of the outer chamber takes place up to the level of the top of the insulator 3.

The arrangement at the lower end of the sleeve 19 will be described with reference to Figure 2. It will be seen that the tube 18 extends beyond the end of the last of the series of conductive layers 20 and that the dielectric 19 tapers off from the outside to the inside of the sleeve at this end, leaving the edge of the end layer 20 at the point 24 and tapering to a thin edge on the tube 18 at the point 25. Between this point and the end of the conductive screen 11 of the cable is a length of bared cable dielectric. Over this length and over the tapering part of the end of the dielectric 19 of the sleeve is built up a body of dielectric material 26 consisting of tightly applied turns of varnished silk tape. This body of dielectric material 26 at the upper end has a cylindrical form of the diameter of the outer surface of the sleeve. This cylindrical part extends from the point 24 to the point 27 which is approximately at the same level as the point 25. From this point the additional dielectric 26 tapers off down to the region where it meets the screen 11. Over this built-up body of dielectric is applied a covering 28 of conductive tape which makes connection at the lower end with the sheath 7 and forms an outer conductive covering as usually applied to buffer cones. The conductive tape 28 connects at the point 24 with the end conductive layer 20 of the sleeve.

By the construction just described the desired distribution of potential is obtained at and near the lower end of the sleeve. The longitudinal stress in the region between the points 24 and 27 at the surface of the cable dielectric 12 is kept very low owing to the uniform diameter of the conductive covering 28. Here, at the same time, the radial stress at the surface of the dielectric 12 is low because of the large diameter to which the additional dielectric 26 is built up. From the point 25 down to the screen 11 any layer of gas at the outside of the cable dielectric 12, if present, must be of very small radial dimensions owing to the nature of the dielectric 12 and the manner in which it has been applied. Here the longitudinal and radial stresses are kept within satisfactory limits by the well-known effect of the buffer cone.

The arrangement for a joint, as shown in Figure 3, is very similar to that described in connection with a termination. This figure shows only one-half of the joint but as the joint is symmetrical the figure constitutes in effect an indication of the form of the whole joint and it will only be necessary to describe the portion shown.

From each end of the lengths of cable to be joined cable dielectric 12 is removed, exposing the conductor 13 and making a smooth, gradually tapering end 30. The two conductors are joined by the ferrule 31. A condenser type sleeve 32 built up of pre-impregnated paper on a Bakelized paper tube 33 with metal foil inserts 34 is slipped over the cable dielectric to the position shown. This sleeve has its dielectric material tapered off at both ends and has the conductive layer at the high potential end near to the tube 33 and the other layers forming a series extending radially outwards so that the layer 34 at the low potential end is near the outside of the sleeve. Over the ferrule 31, bared conductor 13 and the tapered part of the cable dielectric is applied a lapping of conducting tape 36 which is connected with the innermost layer 34 and forms a continuous covering from that layer to the ferrule and thence to the corresponding layer in the other half of the joint. Over this covering and the adjacent end of the sleeve 32 is built up in known manner a body 37 of dielectric material. This at its widest part substantially fits the metal joint sleeve 38.

At the low potential end of the sleeve 32 the construction is the same as that described in connection with Figure 2 for a termination. The dielectric material of the sleeve extends endwise beyond the outmost conductive layer 34 tapering inward to the tube 33. Over this tapering part and the adjacent cable dielectric is built up a body 39 of dielectric material formed of tightly lapped varnished silk tape and over this a layer of conductive tape 40 is applied extending from the cable screen 11 to the outer surface of the sleeve making connection with the conductive layer 34 at that end of the sleeve. The layer 40 is extended, in this case, over the sleeve and the additional dielectric material 37 so as to form a complete covering of the joint. The body of additional dielectric 39 has a cylindrical form from the end of the sleeve to beyond the end of the tube 33 and then tapers off in a buffer cone.

The joint sleeve 38 is filled with compound up to the level 42 in the domes 43 and 44. The upper parts of these domes are filled with gas under pressure which is in communication with the interior of the cable by way of the pipes 45.

What we claim as our invention is:

1. A construction suitable for terminations and joints of electric cables, comprising a length of cable on the end part of which the dielectric has been laid bare by removal of the conductive covering, a sleeve of dielectric material fitting over part of the bared end of the cable dielectric and containing co-axial conductive layers, whereby the stress distribution in and near the bared cable dielectric is controlled, a conductive layer at the earth or earthy end of the sleeve being located at or near the outer surface of the sleeve and the dielectric material of the sleeve being extended beyond this layer, tapering off towards the inner surface of the sleeve, a body of dielectric material extending over this tapering part and a length of bared cable dielectric adjacent to it, said body extending from said conductive layer to the commencement of the conductive covering on the cable dielectric, tapering off to the latter, and a conductive skin applied over the outside of the said body joining electrically the said layer to the said covering.

2. A construction suitable for terminations and joints of electric cables, comprising a length of cable on the end part of which the dielectric has been laid bare by the removal of the conductive covering, a sleeve of dielectric material fitting over part of the bared end of the cable dielectric and containing co-axial conductive layers, whereby the stress distribution in and near the bared cable dielectric is controlled, a conductive layer at the earthy end of the sleeve being located at or near the outer surface of this sleeve and the dielectric material of the sleeve being continued longitudinally beyond this layer, tapering off towards the inner surface of the sleeve, a body of dielectric material built up over this tapering part and a length of the adjacent bared cable dielectric to the diameter of the outside of the sleeve to form a cylindrical portion, so disposed that the tapering end of the sleeve lies wholly within it, and to form a tapering portion beyond the cylindrical portion extending to the commencement of the conductive covering on the cable dielectric and a conductive skin on this built-up dielectric material joining electrically the said conductive layer to the said covering.

3. A termination of an electric cable, comprising a length of cable on the end part of which the dielectric has been laid bare by the removal of the conductive covering, a sleeve of dielectric material fitting over part of the bared end of the cable dielectric and containing co-axial conductive layers spaced radially and longitudinally relative to each other the two end layers being at or near the outer surface of the sleeve and that at the high potential end being connected with the cable conductor, the dielectric material of the sleeve at the earthed or earthy end tapering off towards the inner surface of the sleeve, a body of dielectric material built up over this tapering part and the adjacent length of bared cable dielectric to the commencement of the conductive covering on the cable dielectric, tapering off to the latter, and a conductive skin on the said body joining electrically the conductive layer at the adjacent end of the sleeve to the said covering.

4. A joint of an electric cable comprising a length of cable on the end part of which the dielectric has been laid bare by the removal of the conductive covering, a sleeve of dielectric material fitted over part of the bared end of the cable dielectric and containing co-axial conductive layers spaced radially and longitudinally relative to each other, whereby the stress distribution in and near the bared cable dielectric is controlled, the layer at the high potential end being at or near the inner surface of the sleeve and being connected with the cable conductor, the layer at the earth or earthy end of the sleeve being at or near the outside of the sleeve and the dielectric material of the sleeve being continued beyond this layer, tapering off towards the inner surface of the sleeve, a body of dielectric material built up over this tapering part and the adjacent bared cable dielectric and extending to the commencement of the conductive covering on the cable dielectric, tapering off to the latter, and a conductive skin on said body joining electrically the said layer to the said covering.

CHARLES JAMES BEAVER.
EDWARD LESLIE DAVEY.
JOHN HENDERSON PIRIE.